United States Patent Office 3,418,298
Patented Dec. 24, 1968

3,418,298
**CATALYTIC COPOLYMERIZATION OF BUTA-
DIENE CHLORIDES WITH DIENES**
Clifford O. Eddy, Jr., Independence, Ohio, assignor to
PPG Industries, Inc., a corporation of Pennsylvania
No Drawing. Filed July 12, 1965, Ser. No. 471,408
7 Claims. (Cl. 260—82.1)

ABSTRACT OF THE DISCLOSURE

Copolymerization of reactive butadiene chlorides with less reactive dienes to form a copolymer containing more than 30 mole percent of the less reactive diene is accomplished by the use of catalysts which are compounds of iridium, rhodium or ruthenium. The preferred reactive butadiene chloride is 2,3-dichlorobutadiene-1,3 and preferred less reactive dienes are 1,3-butadiene and 2-chlorobutadiene-1,3. Preferred catalysts are rhodium (I) compounds.

---

This invention relates to new and useful copolymers of butadiene chlorides and polymerizable, diene comonomers. If further relates to their preparation utilizing novel polymerization catalysts. It especially relates to heretofore inaccessible copolymer compositions and to their preparation.

Previously, the polymerization of butadiene chlorides, e.g. 2,3-dichlorobutadiene-1,3, and the copolymerization of these butadiene chlorides with other polymerizable, diene comonomers have been by free radical means. Thus, in Carothers, U.S. Patent No. 1,965,369, is recited numerous examples of the free radical polymerization and copolymerization of 2,3-dichlorobutadiene-1,3 with other monomers.

Copolymers prepared by this free radical process have a large fraction of the butadiene chloride incorporated in them, commonly 90 to 95 percent by weight. Butadiene chlorides, especially 2,3-substituted butadiene chlorides, have an extreme tendency to polymerize and in the common copolymerization systems the reactivity ratios heavily favor the incorporation of a large proportion of the butadiene chloride component. In these systems a composition limit is reached at which the reactivity ratios prohibit the incorporation of the less reactive monomer in the copolymer above a certain level.

This composition limit results from the extreme reactivity inherent with the butadiene chlorides. An examination of the instantaneous copolymer composition as a function of the 2,3-dichlorobutadiene-1,3 monomer concentration for the 2,3 - dichlorobutadiene - 1,3/1,3-butadiene system, for example, reveals this unavoidable ease of preparing copolymer containing large amounts of the 2,3-dichlorobutadiene-1,3 component even when this reactive comonomer is charged in a very low concentration.

To even approach the copolymer composition limit of up to 30 mole percent of the less reactive component in the free radical system, would involve charging the monomer mixture with a high concentration of the less reactive monomer. Several disadvantages are encountered when this is done. One is a diminishing rate of polymerization late in the process. This is a relative rate phenomenon resulting when the propagation rate slows because of reactive monomer exhaustion and the termination rate remains constant. This produces a decrease in the overall polymerization and in those systems in which the less reactive monomer is present in large excess the polymerization rate will be substantially reduced. Another is the consumption of the less reactive comonomer by side reactions. Dimerization often occurs. Other side reactions consume the diene which is present in excess amounts. If polymerizations are done batchwise, the large excess of diene comonomer has to be vented and wasted. Large expenses may accrue in recovering it. If the polymerizations are done continuously, large amounts of unreacted diene comonomer have to be recycled.

When comonomers such as those contemplated herein are charged in equal or nearly equal amounts, the frequency of forming 1,4-trans units in the copolymer is favored. Trans-1,4 configuration of butadiene units in a polymer is desirable for its corresponding useful physical properties. The unequal comonomer charges necessary in the free radical process to prepare copolymer which contains diminished amounts of the reactive component result in copolymer which is polymerized substantially cis-1,4 and/or 1,2 rather than the desirable trans-1,4. Physical properties of the resulting copolymer thus suffer.

It has now been discovered by the process of this invention that a butadiene chloride can be copolymerized with a polymerizable, hydrocarbon diene comonomer in the presence of a Group VIII (Periodic Table) metal compound catalyst such that the reactivity ratios of the comonomers are varied whereby to prepare a copolymer whose composition favors the less reactive component. In accordance herewith, it has been discovered that copolymers which are comprised of more than 30 mole percent and up to about 95 mole percent of the less reactive component, more normally between 40 and 70 mole percent, can now very easily be prepared by using proper amounts of Group VIII (Periodic Table) metal compound catalysts. Thus, by virtue of this invention, copolymers which are consistent in composition and physical properties are readily prepared. Further, it has been found that such copolymers are provided at a high rate of copolymerization because the process of this invention makes it feasible to charge the more reactive monomer in a higher concentration so that it is not soon depleted. The propagation rate, as well as the termination rate, is thus maintained substantially constant. Since large concentrations of the less reactive monomer are not necessary in the process of this invention to prepare copolymer which contains major amounts of the less reactive component, losses from side reactions and recycling are kept at a minimum and simple charge ratios are conveniently handled. Further, the convenient comonomer charge ratios favor the polymerization of a substantial number of the diene units to the trans-1,4 configuration thus enhancing the physical properties of the prepared copolymer. A polymerization process utilizing novel catalysis is thus provided by one embodiment of this invention to prepare, as another embodiment hereof, novel copolymer compositions.

In accordance herewith, a polymerizable, hydrocarbon diene monomer such as butadiene is copolymerized in an aqueous emulsion containing a Group VIII (Periodic Table) metal compound catalyst, such as a rhodium halide, a free radical inhibitor such as phenyl-β-naphthylamine, and an emulsifying agent such as an alkyl sulfonate with a butadiene chloride to prepare copolymer having more than about 30 mole percent and as high as 95 mole percent of the hydrocarbon diene comonomer incorporated therein. Thus, in the presence of the Group VIII metal compound catalyst the comonomers are consumed according to reaction rates which have been altered by the catalyst. More particularly, copolymers are herein prepared of between 40 and 70 mole percent of the less reactive component, i.e. the hydrocarbon diene.

These copolymers containing upwards of 30, more preferably at least 40 mole percent butadiene or like hydrocarbon diene, possess especially desirable properties by virtue of their high hydrocarbon diene content. The larger amount of the less reactive diene component incorporated in the copolymer provides more flexibility with a lower glass transition temperature and room temperature modulus. Because of these new properties, these novel copolymers find new uses. These novel copolymers contain enough chlorine to be available in oil resistance and fire resistance uses and possess enough polarity to be easily filled with rubber fillers such as a finely-divided hydrated silica, e.g. Hi-Sil (a very fine particle size hydrated silica manufactured by the Pittsburgh Plate Glass Company), for applications in rubber fabrication and synthetic leather uses including shoe soles. These polymers are extremely tough, water resistant, impermeable, and have high tear strengths so that they can be used as wrapping films such as for storage bags or as films to be cast as protective coatings on various objects such as for metal pipe coatings or upholstery protectors, e.g. automobile seat covers. They are also useful as adhesives, especially metal to metal bonding adhesives, the butadiene chloride component providing the necessary polarity and the less reactive diene component supplying tackiness.

The invention is best practiced by carrying out the polymerization in an emulsion system although solution or suspension polymerization may also be used to advantage. In the emulsion system a liquid phase polymerization takes place by agitating an organic monomer solution with an aqueous solution containing catalyst, free-radical inhibitor, and an emulsifying agent whereby the emulsifying agent serves as a surface active agent so that the organic moiety is distributed into the aqueous layer to effect polymerization thereby.

The catalysts which are useful herein are the compounds of metals selected from Group VIII of the Periodic Table. The metals selected from Group VIII of the Periodic Table may be compounded with any anion; however, the more useful anions are the halogens and halogen containing anions. Thus, salts such as ferrous perchlorate, ferrous fluorosilicate, ferric fluorosilicate, cobaltous chlorate, cobaltous perchlorate, cobaltous chloride, cobaltic chloride, cobaltous fluorosilicate, nickel perchlorate, nickel chloride, ruthenium fluoride, palladium bromide, palladium chloride, palladium cyanide, palladium fluoride, osmium chloride, osmium fluoride, iridium bromide, iridium fluoride, platinum bromide, platinum chloride, platinum cyanide, and platinum fluoride are contemplated. One preferred group of catalysts consists of the chlorides of iridium, rhodium, and ruthenium, the trichloride of rhodium being especially useful. These catalysts may also be provided by organic—Group VIII metal compounds or complexes, notably organic—rhodium (I) complexes such as bis(1,5-cyclooctadiene-$\mu,\mu'$-dichlorodirhodium). Other such complexes which are useful as catalysts include diammonium palladium chloride, ruthenium chloride triphenylphosphine, ruthenium chloride tri-n-butylphosphine, dichloro-bis(ethylene)-$\mu,\mu'$-dichlorodiplatinum (II), bis(benzonitrile) dichloropalladium (II), rhodium heptanoate, tetrakis(ethylene)-$\mu,\mu'$-dichlorodirhodium (I), cobaltous chloride dipyridine, bis(1,5-cyclooctadiene) - $\mu,\mu'$ - dibromodirhodium, bis(1,5 - cyclooctadiene) - $\mu,\mu'$ - diiododirhodium, bis(1,5 - cyclooctadiene)-$\mu,\mu'$ - diacetatodirhodium, 1,5 - cyclooctadiene - piperidine - chlororhodium, 1,5 - cyclooctadiene - p - toluidine-chlororhodium, 1,5 - cyclooctadiene - triphenylphosphine-chlororhodium, 1,5 - cyclooctadienylrhodium, and bis(dicyclopentadiene)-$\mu,\mu'$-dichlorodirhodium. The preparation of these complexes is described in the Journal of the Chemical Society, 1957, 4735.

The catalyst may be used at concentrations as wide as from 1:20,000 to 1:20 mole ratio of catalyst to monomers. Generally, the catalyst is present within a catalyst to monomer mole ratio of from 1:2000 to 1:200. Some of the rarer catalysts, e.g. the organic-rhodium (I) complexes, may be used to advantage at concentrations as low as 1:20,000 mole ratio of catalyst to monomers. The more readily available catalysts may be used at higher concentrations. If a large amount of catalyst is used, i.e. more than about 1 mole of catalyst per 20 moles of monomer, some difficulty may be encountered in removing it from the polymerization product and more washing may be required. Less than the preferred minimum amount of catalyst may not be effective.

Among the butadiene chlorides which may be polymerized in accordance herewith are 2,3-dichlorobutadiene-1,3 and 2-chlorobutadiene-1,3. The 1,4-substituted butadienes are also useful but the 2,3-substituted butadiene chlorides are preferred. These monomers exhibit extreme reactivity towards polymerization and two or more may be used as a comonomer system. By way of example, 2,3-dichlorobutadiene-1,3 and 2-chlorobutadiene-1,3 may be copolymerized as herein contemplated.

Copolymers of one or more butadiene chlorides may be obtained with one or more hydrocarbon diene comonomers such as butadiene-1,3, isoprene, 2,3-dimethylbutadiene-1,3, and other dienes with short chain substituents (containing less than 4 carbon atoms each) linked to the diene backbone carbons. Generally, hydrocarbon diene comonomers containing up to 10 carbon atoms are preferred. It is also preferred that the terminal double bond carbons of the hydrocarbon dienes be free of substituents so that butadienes substituted in the 2,3-positions are most useful. Butadiene-1,3 is especially useful.

To achieve a particular copolymer the proportion of comonomers is varied taking into account their reactivity ratios in the catalyst system herein described. Thus, by way of example, a polymerization charge comprising 33 mole percent 2,3-dichlorobutadiene-1,3 and 67 mole percent 1,3-butadiene provides a copolymer which is comprised of about 52 mole percent 2,3-dichlorobutadiene-1,3 and 48 mole percent 1,3-butadiene. When this same charge composition, viz. 33 mole percent 2,3-dichlorobutadiene-1,3 with 67 mole percent 1,3-butadiene, is polymerized by conventional free radical means the resulting copolymer composition first formed contains about 82 mole percent 2,3-dichlorobutadiene-1,3 and 18 mole percent 1,3-butadiene or substantially more of the 2,3-dichlorobutadiene component than the instantly prepared counterpart. Similarly, by the process of this invention, a 16.7 mole percent charge of 2,3-dichlorobutadiene-1,3 with 83.3 mole percent 1,3-butadiene results in a copolymer with the respective composition of about 26 mole percent 2,3-dichlorobutadiene-1,3 and 74 mole percent 1,3-butadiene.

Copolymers are thus provided which contain variable amounts of chlorine and are therefore valuable for a gamut of uses where the presence in the polymer of controlled chlorine contents is advantageous.

An oxidizing atmosphere has deleterious influence on this polymerization. As a result, it is advisable to conduct the polymerization in an oxygen free (or at least oxygen lean) atmosphere. This entails removing a substantial amount of oxygen bearing air from the reaction mixture and polymerization vessel. This may be easily accomplished by thoroughly flushing the apparatus used in the polymerization with an inert gas such as argon to displace the air thereby and thereafter sealing the reaction vessel to prevent air from re-entering.

As a precautionary measure, however, and in preferred practices a free radical inhibitor is desirable to insure that this polymerization does not suffer by the influence of free radical initiation. Precluding the presence of thermally generated radicals is also good practice. To prevent these radicals from interfering, various free radical inhibitors can be employed, most notable among these being iodine, amines, and quinones such as benzoquinone. Phenyl-$\beta$-napthylamine (PBNA) is preferable. Free radical retarders such as nitrobenzene may also be used.

A sufficient quantity of inhibitor is employed to scavenge the radicals produced. Ordinarily, free radical inhibitor of from 0.2 to 2.0 parts by weight per 100 parts by weight of monomer can be used to advantage. Smaller amounts may be employed although higher polymerization temperatures or unusually high amounts of oxygen present in the system may consume all of the inhibitor and still allow a generation of a free radical process. Larger amounts than are needed to inhibit any free radical process may be present in the final copolymer and result in a discolored product. An excessive amount of washing may be required to remove them and restore the usual color.

Emulsifying agents useful in the instant invention may be ionic or nonionic or mixtures thereof. Numerous agents will qualify to provide the emulsion system including sodium alkylbenzene sulfonates, sodium lauryl sulfates, organic phosphates, and other alkyl or aryl sulfonates, sulfates, or phosphates possessing variable hydrophillic character.

The type of emulsion desired dictates the amount as well as the type of emulsifier added. These factors affect the rate of polymerization and, consequently, the yield of copolymer produced. Generally, it is desirable to use enough emulsifying agent such that all of the monomer molecules are distributed into the aqueous phase with agitation. In an emulsion polymerization, some of the monomer units are held within the hydrocarbon cores of the emulsifying agent but most of the monomer is in a third phase in the form of droplets covered with a monolayer of surface active agent (emulsifying agent) molecules. In this form, the monomer units can be contacted with the catalyst in the aqueous phase to effect polymerization thereby. Thus, it is necessary to select an amount of emulsifying agent which corresponds to the result desired. Preferably, 1 to 20 parts by weight of emulsifier per 100 parts of monomer by weight is satisfactory.

The aqueous phase containing catalyst, free radical inhibitor, and emulsifying agent may vary from a few percent by weight of the organic, monomer phase to many times the weight of the organic, monomer phase. Commonly, an amount by weight of water from 0.5 to 10 times the amount by weight of monomer is preferred. By way of illustration, when 2,3-dichlorobutadiene-1,3 is copolymerized with 1,3-butadiene, an appropriate charge is 5 parts by weight of water per 1 part by weight of monomer.

Temperature ranging from about —10° C. to about 100° C. under atmospheric pressure are suitable. Temperatures between 20° C. and 80° C. are preferable. Atmospheric pressures are generally suitable but should either superatmospheric or subatmospheric pressures be desired, the temperature is varied accordingly.

The polymerization is usually complete within 24 hours and often by 6 to 10 hours. However, a polymerization may be stopped at any convenient time and the formed polymer removed therefrom. Longer times than about 24 hours do not hinder the polymerization. The polymerization will have proceeded to a substantial conversion within about 20 hours.

The physical characteristics of a polymer may be measured by several different methods. One useful method is by a torsion pendulum analysis at increasing temperatures. In this procedure a molded bar of the polymer sample to be tested is suspended with one end fixed and the other fastened to a weight. The bar is cooled to a predetermined temperature and slowly warmed while the bar is continuously twisted by setting the weight into a swinging motion. The polymer sample bar provides a certain resistance to this swinging movement commensurate with its particular physical properties as the temperature rises. A periodic measurement of this damping effect provided by the sample bar as the temperature rises gives an indication of the modulus of the sample over a range of temperatures. A plot of the calculated modulus thus obtained versus temperature gives a graphic illustration of the physical properties characteristic of the polymer sample tested. Often, this plot will show various transition states of the polymer which further identifies its physical properties. An examination of this torsion pendulus analysis provides the physical property data desired of the sample and this data can in turn be used in comparison analyses of various polymers. The products of this invention were so tested.

The following examples illustrate the manner in which the invention may be practiced.

Example I

A standard polymerization bottle is flushed with argon for 10 minutes removing a substantial amount of air from the bottle by displacement with the inert gas. At this time 100 milliliters of deaerated water, 2.5 grams of Lanitol F (a sodium alkylbenzene sulfonate produced by Arkansas Chemical Company), 0.1 gram phenyl-$\beta$-napthylamine (PBNA), and 0.25 gram rhodium chloride are added while continuing the argon purge. The purge is continued for thirty additional minutes at which time 10.62 grams of 2,3 - dichlorobutadiene - 1,3 are added. The bottle is then corked and placed on a weighing balance. Liquid 1,3 - butadiene, in excess of the amount desired, is slowly added to the mixture contained in the bottle. The liquid 1,3 - butadiene is allowed to boil away at room temperature providing an additional purge until the balance indicates 9.5 grams are contained in the bottle. Immediately, the bottle is sealed with a bottle cap having a neoprene self-sealing liner. The bottle and its contents are placed in a metal guard and are tumbled in a polymerization bath for 4 hours at 50° C.

The emulsion is coagulated with methanol acidified with hydrochloric acid and the copolymer product is washed with successive portions of methanol, water, and again, methanol and is dried. The yield is 46 percent by weight of a tough, leathery copolymer with an overall composition of about 59 mole percent 2,3 - dichlorobutadiene-1,3 and 41 mole percent 1,3 - butadiene. This material is soluble in warm benzene and softens at about 55° C. An infrared spectrum of the material indicates substantial 1,4 - trans configuration of the linkages in the butadiene fraction. A torsion pendulum analysis shows a transition intermediate between poly 2,3 - dichlorobutadiene - 1,3 and trans poly 1,3-butadiene.

Example II

A polymerization mixture is prepared as in Example I except no rhodium chloride is added. After tumbling for 25 hours at 50° C., no product is recovered indicating an absence of a conventional free radical process.

Example III 2,3 - dichlorobutadiene - 1,3 and butadiene - 1,3 are polymerized using different catalysts following the procedure of Example I. The results and conditions of these experiments are as follows:

| Dichlorobutadiene,[2] grams | Butadiene,[2] grams | Catalyst, grams | Reaction time, hours | Temp., °C.[1] | Yield weight percent | Composition of copolymer, mole percent dichlorobutadiene [2] |
|---|---|---|---|---|---|---|
| 6.15 | 5.40 | AIBN,[3][4] 0.40_ | 23 | 30 | 38 | 82 |
| 6.15 | 5.40 | RhCl$_3$, 0.15___ | 15 | 30 | 59 | 52 |

[1] Temp., ° C.=Temperature, degrees centigrade.
[2] Dichlorobutadiene=2,3-dichlorobutadiene-1,3; butadiene=butadiene-1,3.
[3] AIBN=Azoisobutyronitrile (free radical initiator).
[4] No phenyl-$\beta$-napthylamine added.

Example IV

Following the procedure of Example I, 6.15 grams 2,3-dichloro - butadiene - 1,3, 5.20 grams 1,3 - butadiene, 100 milliliters deaerated water, 2.5 grams Lanitol F, 0.1 gram PBNA, and 0.20 gram bis(1,5 - cycloctadiene)-$\mu,\mu'$-dichlorodirhodium catalyst are added to a standard polymerization bottle. The bottle and its contents are tumbled at 75° C. for 2.5 hours in a polymerization bath. A very rubbery copolymer with a low room temperature modulus is recovered in a 14.2 percent yield and it contains about 64 mole percent 2,3 - dichlorobutadiene-1,3 and 36 mole percent 1,3-butadiene.

Example V

The substitution of an equimolar amount of iridium chloride for rhodium chloride in Example I produces a copolymer in a 40 percent yield having a composition comprising about 50 mole percent 2,3-dichlorobutadiene-1,3.

Example VI

The procedure of Example I is followed except that 6.15 grams of 2,3-dichlorobutadiene-1,3, 13.0 grams of 1,3-butadiene, 0.5 gram rhodium chloride, and 0.2 gram PBNA are used. A product is recovered after 6 hours at 50° C. in the polymerization bath in a 25 percent yield. Its composition comprises about 27 mole percent 2,3- dichlorobutadiene - 1,3, and 73 mole percent 1,3-butadiene.

Example VII

A sample of the powdery product from Example VI is dissolved in warm benzene and is cast on a silvered mirror. After drying overnight in a still environment, a dried film is peeled off in the form of a thin disk. This disk is tan in color and is quite resilient to external force.

Example VIII

A copolymer comprised predominantly of the 2-methylbutadiene - 1,3 component is recovered after agitation for 10 hours at 60° C. of a polymerization mixture charged with a 1:2 weight ratio of chloroprene:isoprene monomers, deaerated water, emulsifying agent, free-radical inhibitor, and rhodium nitrate catalyst.

The invention has been described with reference to emulsion or heterogeneous polymerization. It may also be practiced with homogeneous systems with the selection of a proper solvent. Any inert solvent which will provide a one-phase medium may be employed.

While the invention has been described with reference to the details of certain specific embodiments, it is not intended to be limited thereto except insofar as indicated by the following claims.

I claim:

1. A method of preparing a copolymer of 2,3 - dichlorobutadiene - 1,3 monomer and 2 - chlorobutadiene-1,3 comonomer, said comonomer being less reactive than said monomer, which comprises introducing said monomers into a liquid polymerization system containing a metal compound catalyst of a metal selected from the group consisting of iridium, rhodium and ruthenium, the amount of said less reactive comonomer introduced ranging from an amount equal to, to an amount less than that of the more reactive monomer introduced, the relative reactivity ratios of said monomers being varied by said catalyst whereby to produce a copolymer having incorporated therein from 30 to 95 mole percent of 2-chlorobutadiene-1,3.

2. A method of preparing a copolymer of a reactive 2,3-dichlorobutadiene monomer and a polymerizable less reactive hydrocarbon diene comonomer which comprises introducing said monomers into a liquid polymerization system containing a metal compound catalyst of a metal selected from the group consisting of iridium, rhodium and ruthenium, the amount of said less reactive comonomer ranging from an amount equal to, to an amount less than that of said more reactive monomer introduced, the relative reactivity ratios of said monomers being varied by said catalyst whereby to produce a copolymer having incorporated therein from 30 to 95 mole percent of said hydrocarbon diene comonomer.

3. The method of claim 2 wherein said hydrocarbon diene comonomer is 1,3-butadiene.

4. The method of claim 2 wherein said metal compound catalyst is a rhodium (I) compound.

5. The method of claim 2 wherein the metal compound catalyst is bis (1,5 - cyclooctadiene) - $\mu,\mu'$ - dichlorodirhodium.

6. The method of claim 2 wherein the metal compound catalyst is the halide of said metal.

7. The method of claim 2 wherein the metal compound catalyst is trichloride of rhodium.

References Cited

UNITED STATES PATENTS

| | | | |
|---|---|---|---|
| 1,965,369 | 7/1934 | Carothers et al. | 260—87.5 |
| 2,066,329 | 1/1937 | Carothers et al. | 260—87.5 |
| 2,066,331 | 1/1937 | Carothers et al. | 260—87.5 |
| 2,451,180 | 10/1948 | Stewart | 260—94.3 |
| 3,025,286 | 3/1962 | Smith | 260—94.3 |
| 3,168,507 | 2/1965 | Shyrne | 260—94.3 |
| 3,296,227 | 1/1967 | Burleigh | 260—82.1 |

JOSEPH L. SCHOFER, *Primary Examiner.*

J. C. HAIGHT, *Assistant Examiner.*

U.S. Cl. X.R.

260—87.5, 92.3, 94.3